Aug. 8, 1950            G. MOLMANS            2,517,697
TOASTER AND CONTROL OR TIMING MECHANISM
Filed Oct. 28, 1948            2 Sheets—Sheet 1
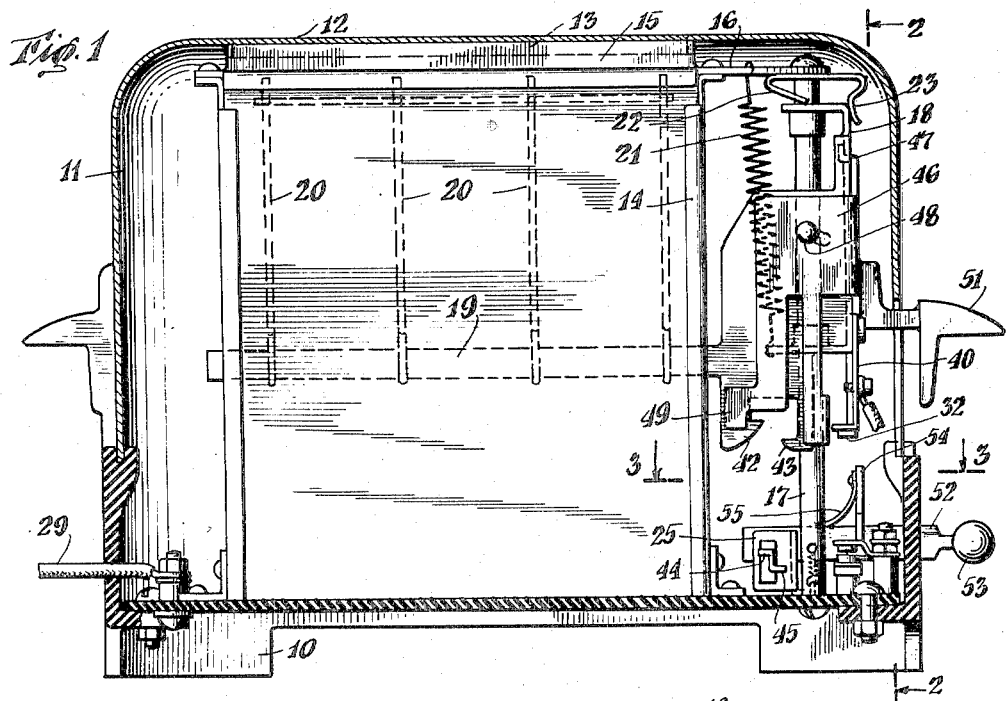
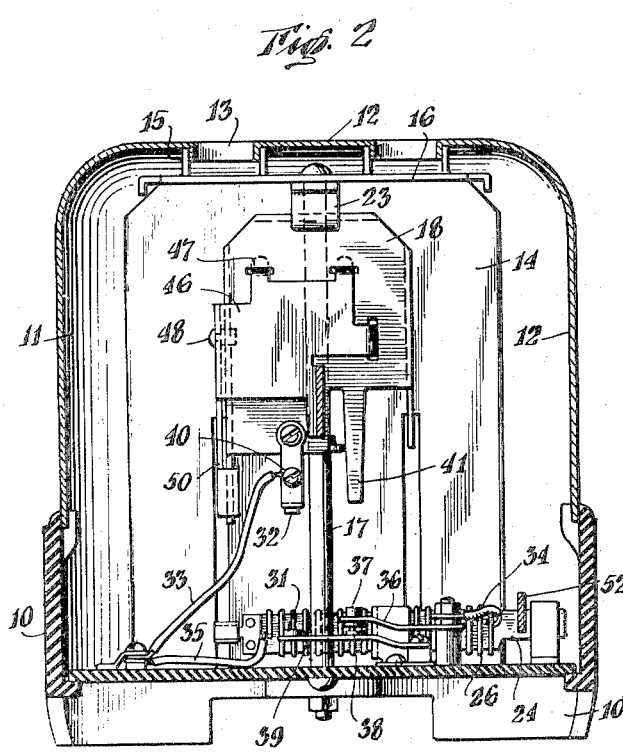
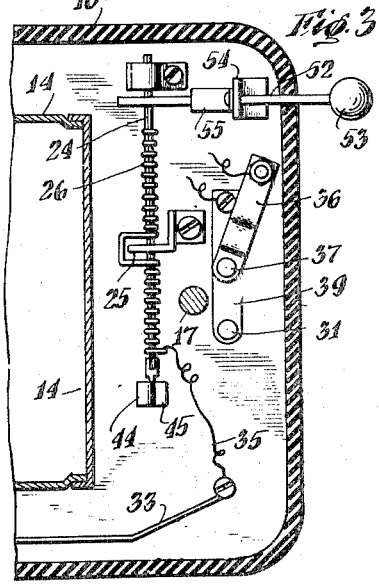
INVENTOR.
Gertrude Molmans
BY Duell and Kane
ATTORNEYS Aug. 8, 1950  G. MOLMANS  2,517,697
TOASTER AND CONTROL OR TIMING MECHANISM
Filed Oct. 28, 1948  2 Sheets—Sheet 2
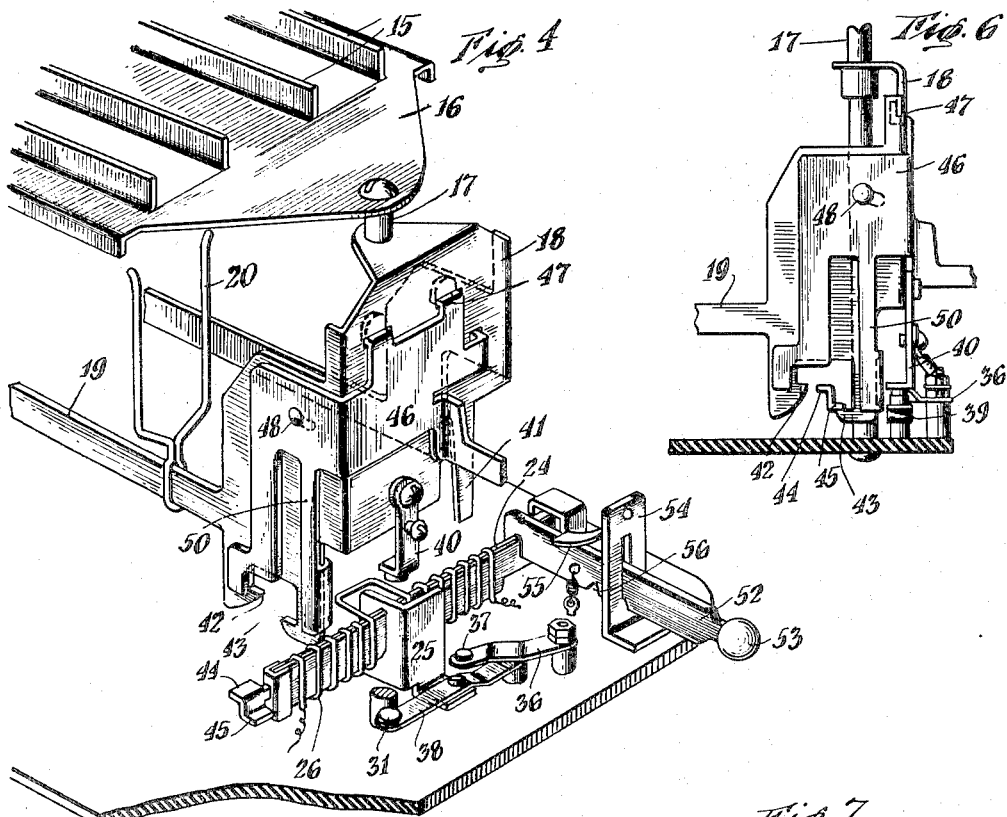
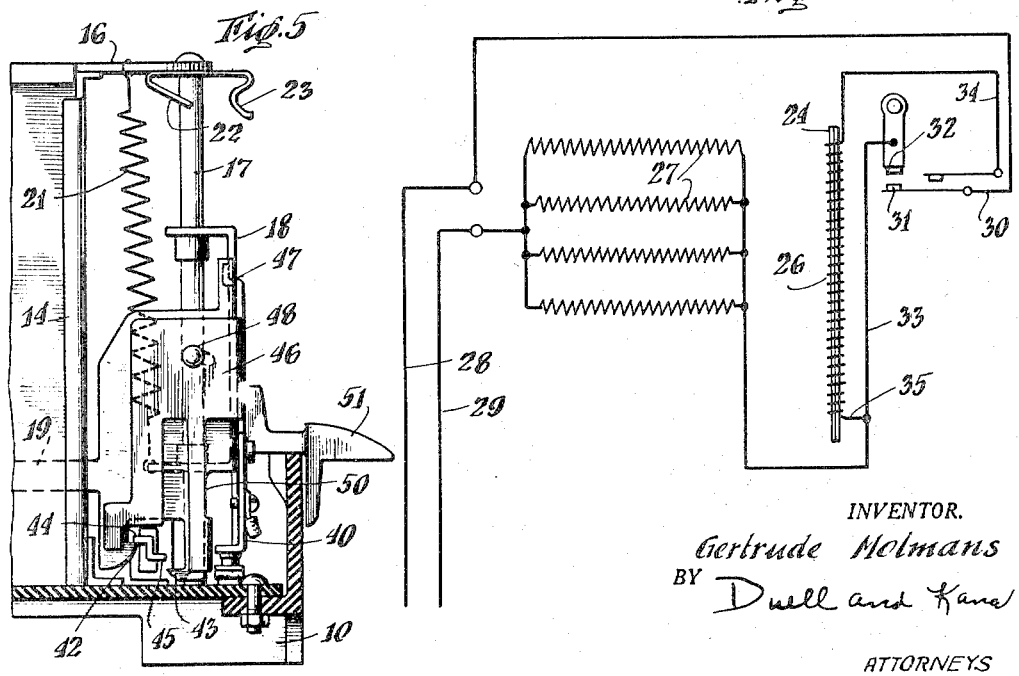
INVENTOR.
Gertrude Molmans
BY Duell and Kane
ATTORNEYS Patented Aug. 8, 1950

2,517,697

UNITED STATES PATENT OFFICE 2,517,697

TOASTER AND CONTROL OR TIMING MECHANISM

Gertrude Molmans, Manhasset, N. Y., assignor to Mimar Products, Inc., New York, N. Y., a corporation of New York Application October 28, 1948, Serial No. 56,937

4 Claims. (Cl. 99—329)

This invention relates to a structurally and functionally improved toaster and a control or timing mechanism especially useful, but not limited to employment with a toaster.

It is an object of the invention to provide an apparatus of this nature in which a series of slices of bread will be uniformly and evenly toasted; the control incorporated within the structure assuring such results.

A further object is that of furnishing a toaster in which the parts may be adjusted in a manner such that a more or less prolonged toasting period may be provided at the will of the operator and at the termination of which period the toasting operation will be automatically discontinued.

A still further object is that of providing a toaster and timing mechanism in which the operation may at any desired instant be interrupted to, for example, inspect the slices of bread which are being toasted and in which thereafter the cycle may be reinitiated to continue the toasting of said slices.

An additional object is that of furnishing an apparatus of the type which will include relatively few parts, each simple and rugged in construction, such parts being capable of ready and economical manufacture, and when produced being capable of ready assembly to furnish a unitary apparatus which will function over long periods of time with freedom from all difficulties.

With these and other objects in mind, reference is had to the attached sheet of drawings illustrating one practical embodiment of the invention and in which:

Fig. 1 is a sectional side view of a toaster.

Fig. 2 is a sectional end view thereof taken along the lines 2—2 in the direction of the arrows as indicated in Fig. 1.

Fig. 3 is a fragmentary sectional plan view taken along lines 3—3 in the direction of the arrows as also indicated in Fig. 1.

Fig. 4 is a perspective view of the forward end of the toaster with the casing removed.

Fig. 5 is a fragmentary sectional side view of the forward part of the assembly.

Fig. 6 is a similar view of said assembly but showing the parts thereof in a different position, and Fig. 7 is a diagrammatic representation of the circuit incorporated in the toaster.

In these views, the reference numeral 10 indicates the base of the apparatus on which there may be supported an exterior casing 11 presenting a top surface 12. The latter is provided with slots 13 through which slices of bread and toast may be passed. Supported upon the base 10 and within the casing 12 is a subsidiary casing 14. The upper face of the latter is formed with upstanding edge portions defining slots 15 aligned with the slots 13. The forward end of casing 14 is preferably extended as at 16, and has secured to it the upper end of a post or rod 17, the lower end of which may be secured to the base 10.

Slidably mounted upon the rod 17 is a carriage which may include a plate 18. Secured to or integral with the latter are extensions 19 mounting, for example, slice supporting trays which may be formed of wire 20. A spring 21 may have one of its ends secured to the extension 16 its opposite end being coupled to the carriage. A leaf type spring serves as a retainer and shock absorbing element. As illustrated, it is mounted adjacent the upper end of post 17 and includes one arm 22 which may be engaged by the upper end of the carriage as the latter moves to its upper extreme of travel and a second arm 23 which frictionally engages the carriage to retain it in elevated position.

A thermostatic strip 24 is provided and is mounted for rocking movement upon the base by, for example, providing a slitted support 25 through which the strip 24 is extended. Accordingly the thermostatic strip extends, under all circumstances, generally transversely of the base. This strip is preferably encircled by a coil 26 of heating wire. Thus, when this coil is energized, the strip 24 will have its free or outer end swing in a direction parallel to the base face to one extreme position. Under a normal or condition of "rest" of strip 24, the outer or free end of the strip will shift to its opposite extreme position. Such a condition will, of course, prevail when coil 26 is deenergized and cool.

With a view to avoiding unnecessary illustration, the heating resistances which effect the toasting operation have not been shown except in Fig. 7. In that view, they have been indicated by the reference numeral 27. Current is supplied through main leads 28 and 29. The latter may be directly connected to one end of the coils 27. Lead 28 is continued in the form of a lead 30 which may carry a switch contact 31 engageable with a contact 32 connected to lead 33. The latter is coupled to the opposite end of coil 27 so that when the circuit is closed between contacts 31 and 32, those coils will be energized. A lead 34 is connected to one end of coil 26 and terminates in a contact closable through the switch associated with lead 30. A lead 35 connects the opposite end of coil 26 with lead 33.

As shown especially in Fig. 2, lead 34 terminates in a resilient switch arm 36. The contact, afore-described as connected to lead 34, is carried by arm 36 and has been indicated at 37. This contact is cooperable with a contact 38 carried by an arm 39 which arm supports the contact 31. Contact 32 is secured to a support 40 affixed to the body of carriage 18 and extending below the same. Preferably extending adjacent the support 40 and integral with the carriage is an actuator extension 41. The latter is disposed in line with contact 37 or any other convenient portion of arm 36 to cause a flexing of the latter and control the circuit of which contacts 37 and 38 form a part.

Part of a latching structure may form an integral portion of carriage 18. This structure conveniently includes a pair of keepers 42 and 43 arranged in opposed relationship and conveniently adjacent the lower edge of plate 18. These portions extend in different horizontal planes. A double latch including parts 44 and 45 is affixed to the outer end of the thermostatic strip 24. These latch parts also extend in different planes and are disposed for selective cooperation with the keeper structures or portions 42 and 43. In the normal or unheated condition of strip 24, latch part 44 lies in a position in which it may extend in cooperating engagement with keeper portion 42. The distance between the innermost edges of the keeper portions is less than the aggregate width of the latch parts 44—45. Therefore, when latch part 44 is freed from keeper portion 42 and the carriage 18 tends to rise under the influence of spring 21, the latch part 45 will engage keeper portion 43.

A latch releasing structure is provided by employing for example, a plate 46 rockingly supported by carriage 18, as indicated at 47. An actuator portion 49 may form a part of plate 46 and lie adjacent keeper portion 42. Thus this actuator may cooperate with and shift latch part 44 when the latter extends in engaging relationship with keeper portion 42 and beyond the same into the plane of actuator 49. An extension 50 may form a part of plate 46 and cooperate with the outer shank of keeper portion 43 to thus limit movement of the plate in an inward direction. The plate may be rocked around a pivot 47 by a handle 51 conveniently extending beyond the casing 12.

With a view to varying the time of response of the thermostatic strip 24, the inner end of the latter may be coupled to an adjusting lever 52. The latter may mount at its outer end and beyond the casing 12 an actuating knob 53. Its body may extend through a slotted guide 54 and one or more springs 55 may cooperate with the lever 52 to normally maintain it in depressed or lowered position. The lower edge of the lever or shifting member 52 may be formed with any desired number of notches 56 for cooperation with the edge of guide 54. Therefore, it is apparent that strip 24 may be rocked around its mounting 25 by projecting and retracting the lever or bar 52. The latter may in turn be maintained in any position to which it has been adjusted as a consequence of the notches 56 cooperating with the guide 54. A rocking of the thermostatic strip 24 with respect to its support 25 will, of course, result in the outer end of the latter together with latches 44 and 45 carried thereby being shifted.

In operation, it will be assumed that slices of bread to be toasted have been introduced through the openings 15 and are supported by the elements 19 and 20. It will also be assumed that leads 28 and 29 have been connected to a suitable source of electrical current supply. If now handle 51 is depressed, this will result in carriage 18 being shifted downwardly over rod 17 and against the tendency of spring 21 to a point at which latch portions 44 and 45 will have cooperated with keepers 42 and 43 so that the latch part 44 engages keeper surface 42 to maintain the parts in depressed position. In this connection, it is to be understood that the unheated thermostatic strip 24 will extend into a position at which the latch part 44 may engage with the keeper surface 42; the resiliency of strip 24 permitting of a flexing or springing of the parts as the strip is shifted. This will occur—first in one direction and then in another—incident to the camming action of the surfaces of the keeper portions with the latch part.

With the parts thus shifted and maintained, it is apparent that contacts 31 and 32 will be engaged and that as a consequence of the actuator 41, contacts 37 and 38 will likewise be engaged to thus close the circuit. Therefore, the resistance coils 27 will be energized and simultaneously the heating coils 26 will be energized. Accordingly, the toasting operation will be initiated. As a consequence of subjecting strip 24 to the action of heat generated by coil 26, it will tend to flex so that its outer end will move to the right as viewed in Figs. 1 and 4. Therefore, latch part 44 will begin to shift to a position at which it releases keeper portion 42, as shown in Fig. 5. As soon as these parts thus clear each other, the carriage under the influence of spring 21 will shift upwardly, as in Fig. 6. However, such shifting will be of a very limited nature because latch part 45 will restrain any full movement of the parts incident to an engagement with keeper portion 43. Consequently, the circuit through heating coils 27 will not be broken because contacts 31 and 32 will remain in electrical engagement. However, contacts 37 and 38 will separate to interrupt the circuit through heating coil 26. Therefore, this coil will cool and strip 24 will begin to cool so that its outer end will commence a movement towards its initial position. With latch part 44 clear of keeper portion 42, such movement of the part will eventually result in latch part 45 clearing keeper portion 43. When this occurs, then under the influence of spring 21, carriage 18 will rise to its initial position.

In such position, the upper edges of the toasted slices will be accessible and visible beyond the opening 13. Likewise, the circuit through the heater coil 27 will have been interrupted incident to the separation of contacts 31 and 32. As will be understood, the toasting operations may either be prolonged or diminished by shifting the knob 53 to correspondingly shift bar or lever 52. With such shifting, it is apparent that in one extreme position only a minimum resistance will have to be overcome in subjecting thermostatic strip 24 to the action of heat to an extent such that the latch part 44 will clear the keeper portion 42. Under an opposite extreme of adjustment, a considerable prolongation of the action by coil 26 will be necessary to effect such clearance. The greater this prolongation the greater will be the period of energization of the coils 27 because strip 24 will in this instance have to cool to a pre-determined extent before latch part 45 may clear keeper portion 43.

If during the toasting operation it is desired to inspect the bread slices which are being subjected to the action of heat, this may readily be done by simply elevating handle 51. With such elevation plate 46 will be rocked around its pivot 47 to cause actuator 49 to engage the edge of latch part 44 and shift the same out of retaining relationship with keeper portion 42. With strip 24 thus free from the action of heat incident to continued energization of coil 26, that strip 24 immediately, after latch 44 being cleared from keeper 42, will spring to the left as viewed in Figs. 1 and 4. Therefore, no cooperation will occur between latch part 45 and keeper portion 43 and, accordingly, the entire carriage assembly will shift upwardly. This action, in addition to interrupting the circuit through coil 27, will allow the slices to be exposed above the casing 12 to an extent where the progress of the toasting operation up to that moment may readily be observed.

Thus among others the several objects of the invention as specifically afore-noted are achieved. It is obvious that various changes in construction and rearrangement of the parts may be resorted to without departing from the spirit of the invention as defined by the claims.

I claim:

1. A timer for a toaster including in combination, a pair of opposed, spaced latch-keepers to be substantially rigid and move with the carriage of a toaster, a latch element presenting opposed edges to cooperate one with each of said keepers, a resilient bar movable responsive to temperature variations and supporting said element to move the same away from one of said keepers and towards the other of the same, the distance between said keepers being less than the distance between the edges of said element and the point of engagement of said edges and keepers being in different horizontal planes whereby as said bar moves different edges of said element will successively engage and clear the keepers as said carriage elevates.

2. A timer for a toaster including in combination, a pair of opposed, spaced latch-keepers to be substantially rigid and move with the carriage of a toaster, a latch element presenting opposed edges to cooperate one with each of said keepers, a resilient bar movable responsive to temperature variations and supporting said element to move the same away from one of said keepers and towards the other of the same, the distance between said keepers being less than the distance between the edges of said element, the retaining surfaces of said keepers being disposed in different horizontal planes and the opposed edges of said element being likewise disposed in different horizontal planes whereby as said bar moves, the different edges of said element will successively engage and clear the keepers as said carriage elevates.

3. A timer for a toaster including in combination, a pair of opposed, spaced latch-keepers to be substantially rigid and move with the carriage of a toaster, a latch element presenting opposed edges to cooperate one with each of said keepers, a resilient bar movable responsive to temperature variations and supporting said element to move the same away from one of said keepers and towards the other of the same, the distance between said keepers being less than the distance between the edges of said element, the point of engagement of said edges and keepers being in different horizontal planes whereby as said bar moves different edges of said element will successively engage and clear the keepers as said carriage elevates and manually operable means cooperating with said bar to shift said element independently of temperature variations.

4. A timer for a toaster including in combination, a pair of opposed, spaced latch-keepers to be substantially rigid and move with the carriage of a toaster, a latch element presenting opposed edges to cooperate one with each of said keepers, a resilient bar movable responsive to temperature variations and supporting said element to move the same away from one of said keepers and towards the other of the same, the distance between said keepers being less than the distance between the edges of said element, the point of engagement of said edges and keepers being in different horizontal planes whereby as said bar moves different edges of said element will successively engage and clear the keepers as said carriage elevates and manual means for increasing and decreasing the resistance to movement offered by said bar.

GERTRUDE MOLMANS.

REFERENCES CITED

The following references are of record in the file of this patent:

UNITED STATES PATENTS

| Number | Name | Date |
| --- | --- | --- |
| 2,234,759 | Graham | Mar. 11, 1941 |
| 2,274,810 | Sardeson | Mar. 3, 1942 |
| 2,302,117 | Gomersall | Nov. 17, 1942 |
| 2,344,842 | Weeks | Mar. 21, 1944 |
| 2,436,735 | Walder et al. | Feb. 24, 1948 |